(12) United States Patent
Miksic et al.

(10) Patent No.: US 6,342,101 B1
(45) Date of Patent: Jan. 29, 2002

(54) MIGRATING CORROSION INHIBITORS COMBINED WITH CONCRETE AND MODIFERS

(75) Inventors: Boris A. Miksic, North Oaks, MN (US); Dubravka Bjegovic, Zagreb (HR); Alla Furman, Shoreview, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 09/415,800

(22) Filed: Oct. 11, 1999

(51) Int. Cl.⁷ .......................... C04B 24/16; C04B 24/12
(52) U.S. Cl. ..................... 106/802; 106/724; 106/725; 106/808; 106/809; 106/810; 106/823
(58) Field of Search ................. 106/802, 808, 106/809, 810, 823, 724, 725, 727, 728

(56) References Cited

U.S. PATENT DOCUMENTS

| | | | | |
|---|---|---|---|---|
| 4,466,834 A | * | 8/1984 | Dodson et al. ............. | 106/728 |
| 5,203,629 A | * | 4/1993 | Valle et al. ................. | 366/2 |
| 5,389,143 A | * | 2/1995 | Abdelrazig et al. ........ | 106/696 |
| 5,435,845 A | * | 7/1995 | Villa et al. ................. | 106/804 |
| 5,597,514 A | | 1/1997 | Miksic et al. .............. | 252/390 |
| 5,626,663 A | * | 5/1997 | Berke et al. ............... | 106/696 |

FOREIGN PATENT DOCUMENTS

| | | | |
|---|---|---|---|
| JP | 50-16719 | * | 2/1975 |
| JP | 50-18522 | * | 2/1975 |
| JP | 50-18523 | * | 2/1975 |
| JP | 50-29645 | * | 3/1975 |

OTHER PUBLICATIONS

H. L. Kennedy, "Portland Cement—Effects of Catalysis and Dispersion", *Industrial and Engineering Chemistry*, American Chemical Society, vol. 28, 1936, pp. 963–969. (no month).

* cited by examiner

*Primary Examiner*—Anthony Green
(74) *Attorney, Agent, or Firm*—Haugen Law Firm PLLP

(57) ABSTRACT

A formulation for blending with raw concrete to form an admixture wherein a concrete plasticizer and migrating corrosion inhibitors are blended with concrete prior to pour. The plasticizer enhances the ability of the concrete to be worked and to be properly finished, and the migrating corrosion inhibitors provide protection of concrete reinforcements such as rebar against corrosion.

3 Claims, No Drawings

MIGRATING CORROSION INHIBITORS COMBINED WITH CONCRETE AND MODIFERS

CROSS-REFERENCE TO RELATED APPLICATION

Formulations in accordance with the present invention are suitably added to concrete admixtures pursuant to the method set forth in copending application entitled "CORROSION INHIBITOR CONTAINER" Ser. No. 09/415,804, filed Oct. 11, 1999 which is now abandoned in favor of continuation-in-part patent application Ser. No. 09/652,893, filed Aug. 31, 2000 and assigned to the same assignee as the present invention.

BACKGROUND OF THE INVENTION

The present invention relates to combinations of selected migrating corrosion inhibitors blended with concrete modifiers to produce novel products or formulations with dual functions for blending with raw concrete.

These novel products incorporate the feature of a concrete mix modifier and provide and/or enable a new method of adding migrating corrosion inhibitors into concrete at a stage where very efficient, synergistic, and long-term rebar corrosion control is achieved.

In an early published reference to the use of concrete modifiers they were described as water reducers. These reducers were typically polymers of condensed naphthalene sulfonic acids and were described in *Industrial and Engineering Chemistry News* in 1936. These sulfonated chemicals were never used on a large scale until the 1970's when they were rediscovered for use as high range water reducers and called superplasticizers.

The main chemicals used in concrete as water reducing agents are the salts of lignosulfonic acids, the salts of hydroxycarboxylic acids, and carbohydrates. Superplasticizers (which are also water reducers) are broadly classified into four groups: sulfonated melamine-formaldelhyde condensate (SMF), sulfonated naphthalene-formaldehyde condensates (SNF), modified lignosulfonates (MLS) and blends of all these with other molecules.

The selected corrosion inhibitors useful for blending with superplasticizers are amino alcohols, amino silanes, amine salts, $Ca(NO_2)_2$, aminocarboxylates such as ammonium benzoate and the glucoheptonate salts as disclosed in U.S. Pat. No. 5,597,514, entitled "Corrosion Inhibitor for Reducing Corrosion in Metallic Concrete Reinforcements", and assigned to the same assignee as the present application.

We have found that a synergistic effect is achieved with the proper ratio and selection of retarder and corrosion inhibitor. We have found that use of a retarder which functions to reduce the bonds between silicate particles produces a much more liquid or fluid concrete mix than one at the same water content but without the retarder. It is believed that this feature facilitates migration of the corrosion inhibitor and provides a much higher level of rebar protection.

The examples were evaluated in three different test procedures designed to measure the effectiveness of corrosion inhibition in the presence of retarder chemicals.

IMMERSION TESTING (ASTM G31-72)

Immersion testing was carried out with carbon steel panels about 1"×4" immersed in 3.5% NaCl solution for 168 hours. The corrosion inhibitor and retarder is added to the salt solution at a 2% level based on active ingredients. After 168 hours the panel is removed, wiped, the corrosion residue removed, and the weight loss due to corrosion determined. The control in the test data was immersed in 3.5% NaCl solution only.

IMPEDANCE TESTING (ASTM G106-89)

The working electrode was a cleaned carbon standard rebar embedded in mortar which was prepared with a mixture of retarder and corrosion inhibitor added as an admixture. The specimens were cured for 28 days and then soaked for 20 hours in a 3% NaCl solution. Impedance spectra was obtained in the range of frequencies $10_6$–$10^{-3}$ Hz The corrosion inhibitor retarder mixture was added to the concrete as suggested by the retarder suppliers. The ratio of inhibitor to retarder was 1 to 3.

CYCLIC POLARIZATION TESTING (ASTM G5-87)

Cyclic polarization curves were obtained by placing a carbon steel electrode in a solution of 3.5% NaCl plus 1.5% $Ca(OH)_2$ which simulates the pore solution in Portland cement mortar. The curve is characterized by scanning the potential from the slightly cathodic area through the potential in the anodic area until the current reaches a level of anodic current of $10^{-3}$ a/cm² and back. The corrosion inhibitor, retarder mixture was added to the 3.5% NaCl solution at a 2% level based on active ingredients. The immersion test (ASTM-G31-72) and the cyclic polarization test (ASTM-G5-87) demonstrate effective protection in a fluid state mode and the ASTM-G106-89 test demonstrate protection in the cured (28 days) concrete specimens.

EXAMPLE I

A corrosion inhibiting concrete water retarder was prepared in accordance with the following formulation:

| Component | Parts by Weight Preferred Blend |
|---|---|
| Melchem (available from General Resources Technology of Eagan, Minnesota) | 10 parts |
| Dimethylethanolamine | 10 parts |
| Ammonium benzoate | 10 parts |
| Water | 70 parts. |

This formulation was utilized as a water retarder and corrosion inhibitor at a ratio of about 1 pound to 100 pounds of cementatious material. The concrete mix that is prepared had a higher ratio of cement to water but the low viscosity facilitated the corrosion inhibitor reaching the rebar quickly and showed enhanced corrosion resistance rebar as measured by electrochemical impedance.

EXAMPLE II

A water soluble melamine formaldehyde sulfonated salt (superplasticizer) was used in preparing the following formulation which is suitable for both water retarding and a means of adding corrosion inhibitors that migrate to rebar and effectively prevent corrosion.

| Component | Parts by Weight |
|---|---|
| Water | 25 part |
| Melchem (available from | 25 part |

-continued

| Component | Parts by Weight |
| --- | --- |
| General Resources Technology Eagan, Minnesota) | |
| Ammonium Benzoate | 25 part |
| Sodium Glucoheptonate | 25 part. |

This solution was added to concrete at a ratio of 0.75 ounce to 1.5 ounces to 100 pounds of cementations material. The concrete mix that was prepared had a much lower viscosity than a comparable mix without this addition. The lower viscosity enabled the corrosion inhibitors to achieve much quicker and effective corrosion blocking as measured by electrochemical impedance and cyclic polarization data as follows:

Corrosion depth in millimeter per year times $10_3$ as measured by Cyclic Polarization:

| | |
| --- | --- |
| Example II | 4.96 |
| Control | 57.3 |

Corrosion depth in millimeters per year as measured by Electrochemical Impedance:

| | |
| --- | --- |
| Example II | .014 |
| Control | .085. |

Immersion testing in 3.5% NaCl for one week showed the following results:

| | Weight Loss |
| --- | --- |
| Example II | .0 mg. |
| Control | 43.6 mg. |

EXAMPLE III

Starflo-AD, commercially available from Georgia Pacific Company, is a highly purified sodium lignosulfonate dried powder intended for use in concrete admixture as a dispersant.

| Component | Parts by Weight |
| --- | --- |
| Starflo AD | 50 parts |
| Dimethylethanolamine | 33 parts |
| Water | 17 parts. |

This formulation was utilized as a water retarder and corrosion inhibitor at a ratio of 0.75 ounce to 1.5 ounces to 100 pounds of cementatious material.

Corrosion depth in millimeters per year times $10_3$ measured by Cyclic Polarization:

| | |
| --- | --- |
| Example III | 40 |
| Control | 57.3. |

EXAMPLE IV

Starflo AD can also be added to concrete mixtures as a powder and when combined with powdered corrosion inhibitors a dry package is obtained which facilitates handling and ease of application.

| Component | Parts by Weight |
| --- | --- |
| Zinc Gluconate | 50 |
| Ammonium benzoate | 10 |
| Amorphous silicon dioxide | 5 |
| Starflo AD | 35. |

Immersion testing in 3.5% NaCl solution for 168 hours showed the following results:

| | Weight Loss |
| --- | --- |
| Example IV | 15.6 mg. |
| Control | 43.6 mg. |

These ingredients combine to form a dry powder that can be packaged in a water soluble bag that is useful as a method of dispersing the mixture.

EXAMPLE V

A calcium lignosulfonate (available under the trade designation "Lignosite CX" from the Georgia Pacific Company) as a solution of about 40% can be used as a base for corrosion inhibitor addition to produce a superplasticizer corrosion inhibitor solution as follows:

| Component | Parts by Weight |
| --- | --- |
| Sodium Glucoheptonate | 40 parts |
| Lignosite CX | 30 parts |
| Ammonium benzoate | 30 parts. |

Immersion testing in 3.5 NaCl solution of Example V showed the following results:

| | Weight Loss |
| --- | --- |
| Example V | 10.5 mg. |
| Control | 43.6 mg. |

Corrosion depth in millimeters per year times $10_3$ measured by cyclic polarization:

| | |
|---|---|
| Example V | 4.6 |
| Control | 57.3. |

This material acts as both a water retarder and corrosion inhibitor when added to concrete at the ratio of about 3 pounds per cubic yard of concrete.

EXAMPLE VI

Sulfonated naphthalene (SNF), available from Boral Co. under the trade designation "Monex SP" is a class of superplasticizer molecules that function effectively as water reducers and slump control. This type of superplasticizer is available from W. R. Grace Co. under the trade designation "WROA-19"; and from Axim Concrete Technologies under the trade designation "1000-SP-MN); and from Handy Chemicals under the trade designation "Disol".

An effective mixture suitable for water retardation and corrosion control is as follows:

| Component | Parts by Weight |
|---|---|
| Monex SP solution | 75 parts |
| Sodium glucoheptonate | 10 parts |
| Ammonium benzoate | 7.5 parts |
| $Ca(NO_2)_2$ | 7.5 parts. |

An immersion test in 3.5% NaCl solution showed the following results:

| | Weight Loss |
|---|---|
| Example VI | 11.0 mg. |
| Control | 43.6 mg. |

Excellent corrosion rate measures were also obtained in impedance and polarization testing as follows:

Impedance Testing (corrosion depth in millimeters per year:

| | |
|---|---|
| Example VI | .014 |
| Control | .085. |

Polarization Testing (corrosion depth in millimeters per year times $10_3$:

| | |
|---|---|
| Example VI | 6.6 |
| Control | 57.3. |

Materials from the above examples can be added to 100 pounds of concrete at a ratio of 0.5 ounce to 4 ounces of solids as required for meeting the desired concrete flow characteristics. Other ratios may also be useful.

What is claimed is:

1. A raw concrete mix containing an additive for plasticizing of the mix and for corrosion control of the concrete, said additive having the formulation:

(a) a concrete plasticizer selected from the group consisting of alkali and alkaline earth lignosulfonates, sulfonated melamine formaldehyde condensates and sulfonated melamine formaldehyde condensate salts, and a migrating corrosion inhibitor selected from the group consisting of ammonium benzoate, sodium glucoheptonate, zinc gluconate and blends thereof, said additive being present in an amount of from between about 0.5 ounce to 4 ounces per cubic foot of raw concrete mix.

2. The raw concrete mix containing an additive as set forth in claim 1 wherein said additive comprises the formulation of each of the following components:

| Component | Parts by Weight |
|---|---|
| Melamine formaldehyde sulfonated salt | 20-30 parts |
| Ammonium benzoate | 20-30 parts |
| Sodium glucoheptonate | 20-30 parts. |

3. The raw concrete mix containing an additive as set forth in claim 2 wherein said additive is in an aqueous suspension comprising from between about 25–35 parts by weight of said formulation and 65–75 parts by weight of water.

* * * * *